United States Patent [19]

Yueh

[11] Patent Number: 4,494,202
[45] Date of Patent: Jan. 15, 1985

[54] FOURTH ORDER PREDICTIVE, AUGMENTED PROPORTIONAL NAVIGATION SYSTEM TERMINAL GUIDANCE DESIGN WITH MISSILE/TARGET DECOUPLING

[75] Inventor: William R. Yueh, Claremont, Calif.

[73] Assignee: General Dynamics, Pomona Division, Pomona, Calif.

[21] Appl. No.: 421,538

[22] Filed: Sep. 22, 1982

[51] Int. Cl.³ .................... G05B 13/02; G06G 7/80
[52] U.S. Cl. .................... 364/462; 244/3.15; 244/3.18; 235/412; 364/453; 318/561
[58] Field of Search ........... 364/453, 456, 462; 235/411, 412, 413; 318/561, 580, 589, 585, 586; 244/3.14, 3.15, 3.16, 3.17, 3.18, 3.19

[56] References Cited

U.S. PATENT DOCUMENTS

| | | | |
|---|---|---|---|
| 2,805,022 | 9/1957 | Shelley | 364/460 X |
| 2,969,536 | 1/1961 | Fearnside | 244/3.19 X |
| 3,189,300 | 6/1965 | Robert | 244/3.19 |
| 3,223,357 | 12/1965 | Bruecker-Steinkuhl | 244/3.19 |
| 3,260,478 | 7/1966 | Welti | 364/462 |
| 3,316,549 | 4/1967 | Hallendorff | 343/7.7 |
| 3,321,761 | 5/1967 | Biagi et al. | 343/7.4 |
| 3,527,429 | 9/1970 | Hawes, Jr. et al. | 244/3.14 |
| 3,575,362 | 4/1971 | Hammond et al. | 318/561 |
| 3,603,531 | 9/1971 | Brückner-Steinkuhl | 244/3.16 |
| 3,631,485 | 12/1971 | Beazell, Jr. | 343/7 ED |
| 3,718,293 | 2/1973 | Willems et al. | 244/3.16 |
| 3,784,800 | 1/1974 | Willoteaux | 244/3.15 |
| 3,897,918 | 8/1975 | Gulik, Jr. et al. | 244/3.19 |
| 3,911,345 | 10/1975 | Totten | 318/561 |
| 4,014,020 | 3/1977 | Barrett, Jr. et al. | 343/7.4 X |
| 4,128,837 | 12/1978 | Page | 235/412 X |
| 4,148,029 | 4/1979 | Quesinberry | 343/7.4 X |
| 4,179,696 | 12/1979 | Quesinberry et al. | 343/7.4 |
| 4,180,205 | 12/1979 | Schwartz | 235/411 |
| 4,224,507 | 9/1980 | Gendreu | 235/412 |
| 4,396,878 | 8/1983 | Cole et al. | 318/586 X |

OTHER PUBLICATIONS

Warren-Price et al: Direct Statistical Evaluation of Nonlinear Guidance Systems, AIAA Guidance and Control Conference, Aug. 1973, pp. 1-11.

Primary Examiner—Felix D. Gruber
Attorney, Agent, or Firm—Neil F. Martin; Lawrence A. Maxham; Edward B. Johnson

[57] ABSTRACT

A method for augmenting a noise-adaptive predictive proportional navigation terminal guidance scheme. In a fourth order configuration with noise adaptive varying gain parameters calculated as a function of time-to-go, this system implements an optimal control law to augment proportional navigation with target and missile information terms and a navigation ratio which is a function of time-to-go. By employing a fourth order system, enhanced use may be made of information already available in the guidance computer and missile control system to decouple target motion information from the missile control signals. Decoupled target motion information facilitates blind-mode operation in the end game, the last few seconds before intercept. Decoupled missile control information enables the airframe to be controlled to predefined orientations for aimed warhead applications. This system is particularly useful for high and medium altitude targets and results in significant miss distance improvement for terminal guidance against small maneuvering targets. The system has additional benefits in that it results in nearly optimal miss distance behavior with sensitivity to unmodeled errors being substantially less than that in modern guidance systems.

15 Claims, 4 Drawing Figures

FOURTH ORDER PREDICTIVE, AUGMENTED PROPORTIONAL NAVIGATION SYSTEM TERMINAL GUIDANCE DESIGN WITH MISSILE/TARGET DECOUPLING

GOVERNMENT CONTRACT

The Government has rights in this invention pursuant to Contract No. N00024-77-C-5117, awarded by the U.S. Navy.

FIELD OF THE INVENTION

This invention relates generally to terminal guidance for guided missiles and more particularly concerns a method for improving terminal guidance performance with minimum sensitivity in a range-dependent scheme, the system having gains which vary with time-to-go in a fourth order system employing an optimal control law and decoupling target motion information and missile control signals for enhanced kill probability of the target.

BACKGROUND OF THE INVENTION

The principles of controlling guided missiles are well known. Basic principles are comprehensibly set forth in Locke, Guidance (1955). Since that book was published, a wealth of information has been developed to refine and improve upon early missile control techniques, and to accommodate new and ever changing environments. Proportional navigation is discussed at various levels of detail in United States Pat. Nos. 3,189,300, 3,223,357, 3,603,531 and 3,718,293.

Earlier techniques worked well for large targets and for targets which were either geographically fixed or were moving relatively slowly and predictably. Such targets were at relatively low altitudes, usually not higher than 80,000 feet, flying at speeds not in excess of Mach 2. For target aircraft of these types, well established means are available in missile guidance computers to provide signals to the missile autopilot which, during terminal guidance, rely upon directly observed boresight error, computed line of sight rate and several other computed and estimated factors, to achieve intercept. Examples of such navigation computers and methods of estimating values used in solving navigational problems are shown in U.S. Pat. Nos. 4,128,837, 4,148,029 and 4,179,696.

However, with high speed, high altitude, maneuvering, small airborne targets, the problems to be solved in order to achieve intercept were greatly increased. In some previously available systems employing noise adaptive gains, the gains were also dependent upon recursive calculations from on-board and possible uplinked information. Because of their sensitivity, these systems, often referred to as Kalman systems, tended to degrade rapidly due to unmodeled errors such as radome aberration, especially for high altitude targets. Thus while these systems had potentially optimal accuracy at intercept, errors which could not be modeled into them tended to degrade the resulting accuracy beyond that of conventional proportional navigation systems.

A third order system, sometimes referred to as Hanson's tracker, has been devised with optimal Kalman structure of combined prediction and correction loops for processing the line of sight data for a terminal guidance computer configuration. This was intended to improve over the range aided filtering technique (RAFT), and employed fixed gains. However, for extended range missiles, at high altitudes (generally in excess of 80,000 feet) it has been found that such a configuration has drawbacks which lead to instability or unacceptable miss distances.

Optimal control laws have been known for some time. Theoretically they should provide improved missile terminal guidance. However, to employ optimal control laws to advantage, it is necessary to have optimal estimation of parameters that would affect such control. In actual practice, the results have been disappointing. As a matter of fact, where estimations are less than optimal, the results of using optimal control laws under actual, as opposed to theoretical, conditions have been a degradation of performance in the terminal phase and either instability or increased miss distance, or both. Even a Kalman estimator, with unmodeled errors, is not optimum and does not support the use of optimal control laws to advantage.

The subject of decoupling in missile control systems has been given considerable attention. However, it has typically been within the context of decoupling the missile body motion from the seeker head or the output of the seeker head with respect to the line of sight data being sensed. Examples of this type of decoupling system are shown in U.S. Pat. Nos. 3,527,429 and 3,897,918.

SUMMARY OF THE INVENTION

Broadly speaking, this invention pertains to a terminal guidance system for missiles employing techniques of proportional navigation in a predictive, noise-adaptive, range-dependent scheme. This four order system employs time varying gains in the guidance filter, the gains depending only upon time-to-go to intercept, the time-to-go being dependent upon range information. Improved miss distance performance is achieved by applying one optimal control law representing proportional navigation augmented with an estimated target lateral acceleration term, and a navigation ratio dependent upon time-to-go and a control effort weighting factor. The use of another optimal control law which accounts for both target and missile lateral acceleration, having a navigation ratio also dependent upon autopilot dynamics, adds further improvement in miss distance by accounting for the first order autopilot time lag. The control gains and the navigation ratio are derived from the applicable optimal control law. The estimated target acceleration is based upon line of sight angular data and the uplinked target maneuvering information supplied by the mother ship. The result is a terminal guidance system that is more robust than the Kalman gain design in that it is less sensitive to unmodeled errors, allowing wider component tolerances without concomitant degradation of system performance.

In this system, which is particularly adapted to medium and high altitude, maneuvering targets, guidance filter gains A and B vary with the varying time constants $\tau_d$ and $\tau_c$ of noise adaptive guidance $\alpha_d$ and $\alpha_c$ filters in known systems, and gain $C_1$ varies empirically as a function of time-to-go to optimize the tradeoff between target acceleration and radome error. Through the use of optimal control laws it has been found that miss distances are nearly optimal while the system sensitivity to unmodeled errors such as radome aberration is decreased. This scheme improves over the related lower order systems for missile performance against maneuvering and possibly jamming targets by decoupling the missile control from target motion information. With the target motion information decoupled from missile control, it is possible to use available information for enhanced prediction of target motion to facilitate blind-mode operation in the end game to intercept. Decoupling of missile control also enables improvements in kill ratio when an aimed warhead is employed. The result is a substantial improvement over known systems at minimal cost for system modification and with a reduction in the computations required as compared with Kalman gain calculations.

This terminal guidance scheme is applicable to either medium range or extended range missiles which may be of the surface-to-air or air-to-air type. The range information may be obtained from either the launching mother ship location (surface or air) as where the missile and target are illuminated by the mother ship radar, an on-board active sensor, or from a passive ranging processor.

BRIEF DESCRIPTION OF THE DRAWING

This invention will be readily understood from the following detailed description when read in conjunction with the accompanying drawing, in which.

DESCRIPTION OF THE PREFERRED EMBODIMENTS

Before the details of the present invention are discussed, additional background information will be set forth for expository purposes.

While the present invention is specifically intended for surface-to-air or air-to-air, medium range and extended range missiles, it is not to be so limited. However, the target is preferably continually illuminated by the mother ship or launching platform to provide a source of information to the semi-active homing apparatus in the missile. The missile itself is typically either the non-rolling or roll-dithering type, the flight characteristics of both being well known.

The present missile guidance design adapts during flight to the changing receiver noise. The computer estimates the noise level and adjusts the filtering based upon that estimation. The Fast Fourier Transform (FFT) signal processing algorithm produces receiver output with spectral properties that characterize the present environments.

The guidance computer consists mainly of the guidance filtering algorithms. Guidance filtering serves two major purposes. It smoothes the noise in calculating the missile-to-target line of sight rate for guidance, and it filters to stabilize any residual missile body motion coupling from the seeker head space stabilization control or from radome error type distortions at the antenna. The noise and body motion requirements on the guidance filtering vary during flight so the guidance computer is programmed to adapt to these changing environments.

The guidance filtering must be heavy enough to smooth the missile's flight. It reduces the general, somewhat unstable, motion due to large random accelerations responding to the noise. These produce excessive angles of attack with their attendant induced drag which dissipates the missile's kinetic energy. Yet the filtering must be light enough to allow quick missile response when needed to correct for heading errors or to chase a maneuvering target. It must filter out enough noise to prevent excessive breakup of the adaptive autopilot's role dither which becomes very small with high altitude, long range flight conditions. The filtering should knock down spikes and transients without overreacting with a heavy filter which remains after the transient and need for smoothing goes away. It should also minimize the effects of quantization and variable data rate.

These demands on the guidance filtering vary during flight. The guidance computer smooths out the tracking error noise and uses information from the autopilot (A/P) and inertial reference unit (IRU) to determine which demand is the most constraining and applies that to the variable filtering.

Figure 1:
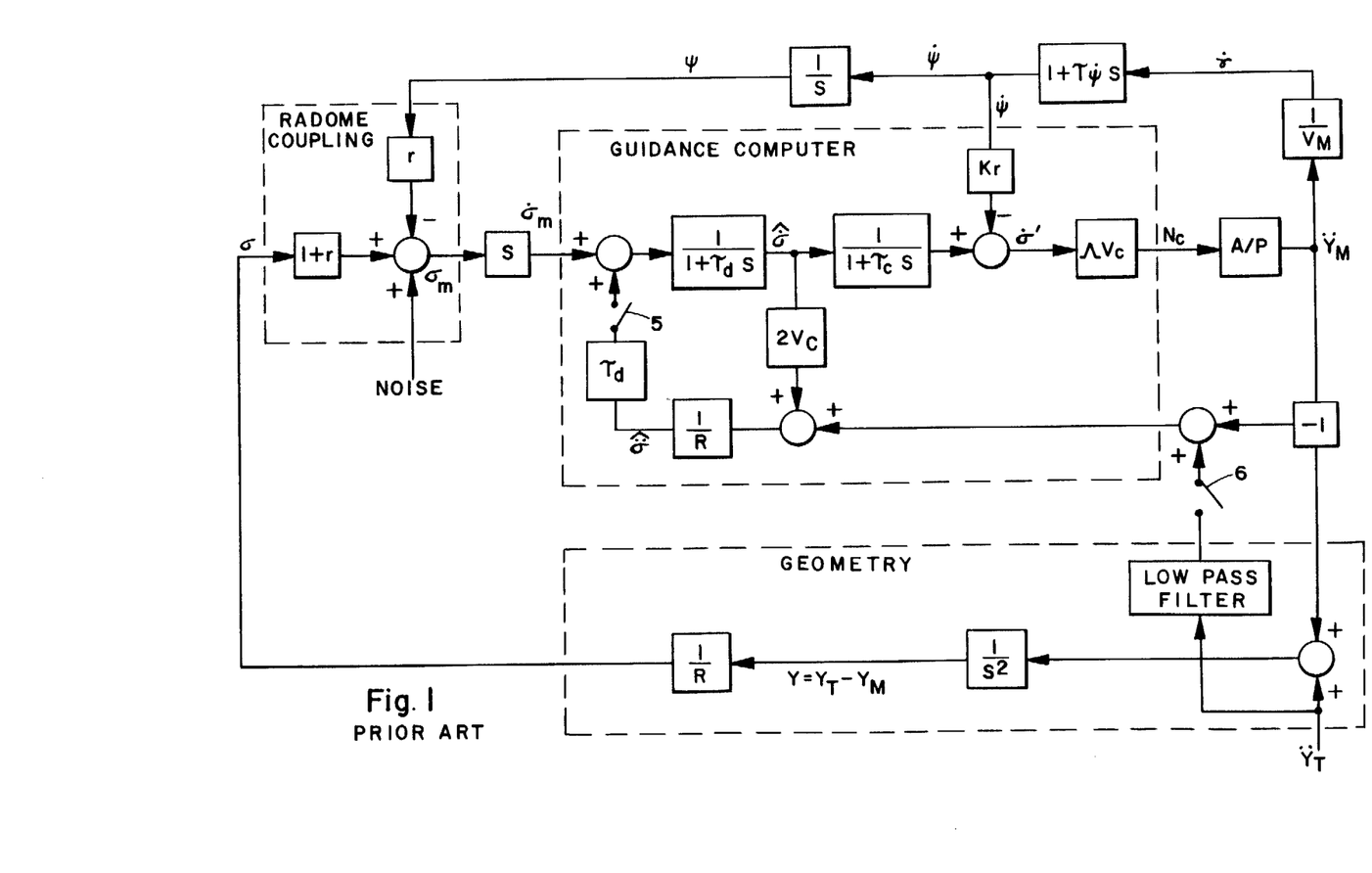
FIG. 1 is a simplified block diagram of the control dynamics of a guidance system having range aided filtering with variable gains in accordance with the prior art.

With reference now to FIG. 1, there is shown a simplified functional block diagram of the geometry loop, or control dynamics, of one channel of a conventional proportional navigation system as it operates in accordance with principles of the prior art range aided filtering technique (RAFT). Normally there would be two such channels to provide inputs to the quadrature control surfaces of the missile. Since they operate in the same manner, it is only necessary to describe one channel. At the left side of the diagram is the line of sight (LOS) angle $\sigma$ input, which is a measurable quantity. In a system such as that under discussion, where the target is illuminated from a reference location and the missile has only semi-active homing means, the LOS angle is computed in the on-board computer system from other available information. The derivation of the LOS angle input to the system will be referred to later.

The operation of the FIG. 1 system will be discussed at this point only to the extent necessary for reference purposes. It is similar in several respects to the system of the invention shown in FIG. 2.

With the feedback loop switch 5 open as shown, the system operates as a conventional proportional navigation system, without range uplink information in the guidance filter, and without an LOS rate prediction term to facilitate homing. The transfer function of the system with the switch open is represented by:

$$\frac{N_c}{\dot{\sigma}_m} = \frac{\Lambda V_c}{(1 + \tau_d S)(1 + \tau_c S)} \tag{1}$$

where
$N_c$ is the acceleration command to the autopilot,
$\dot{\sigma}_m$ is the measured LOS rate with factors relating to radome slope error and noise,
$\Lambda$ is the navigation ratio,
$V_c$ is the closing velocity between missile and target,
$\tau_d$, $\tau_c$ are filter time constants, and
S is a Laplace operator.

When switch 5 is closed, range uplink information is utilized to provide an LOS angle acceleration estimate $\hat{\ddot{\sigma}}$ to the input of the guidance filter. To compute $\hat{\ddot{\sigma}}$, the output of the first filter is multiplied by $2V_c$ and combined with the missile and target acceleration vectors $\ddot{Y}_M$ and $\ddot{Y}_T$. $\ddot{Y}_M$ is information as to actual rate changes from the missile inertial reference unit, and $\ddot{Y}_T$ is the target acceleration vector which may be simulated in the guidance system. This latter input is intended to facilitate terminal guidance performance with respect to maneuvering targets. Note that the $\ddot{Y}_T$ input passes through a ½-second low pass filter when switch 6 is closed to simulate the uplink target information. Because this only provides an additional external leg, the overall impulse response remains unchanged except for miss due to various types of target accelerations. Compensation for heading error, $\dot{\theta}$-bias (rate gyro information as to the seeker head), glint, receiver and amplitude noise are already accounted for in the system and remain unchanged. This combined signal is divided by the uplinked range information, resulting in the $\hat{\dot{\sigma}}$ value. This prediction term is multiplied by a varying $\tau_d$ factor and is combined with the $\dot{\sigma}_m$ as the guidance filter input. Note that the feedback gains $2V_c$ and $1/R$ are both variable, and that $\hat{\dot{\sigma}}$ is therefore range dependent.

It should be observed that the transfer function of equation (1) reflects the fact that the known system of FIG. 1 employs two cascaded first order filters, the $\alpha_d$ filter with a time constant of $\tau_d$, and the $\alpha_c$ filter with a $\tau_c$ time constant. It is within the confines of this structure that the present invention functions. It is an object of this invention that it be compatible with the existing design, while significantly improving missile guidance performance in the terminal phase.

Kalman filters, that is, methods of providing theoretical optimal estimation in accordance with principles generally attributed to Kalman, are employed in what are commonly referred to as modern guidance systems. Such systems are those which provide both correction and prediction terms to facilitate intercept. It is generally agreed that a Kalman filtering scheme imposes more severe requirements on component tolerances such as radome error, band-limited glint and other correlated unmodeled errors, than the conventional proportional navigation system. If component tolerances can be met, the Kalman estimator should render optimal performance, in terms of minimal variance for RMS miss distance. But in actual practice, optimal performance and optimal results are unlikely. As component tolerances of measurement errors degrade, which is usually the case for radome refraction error for example, the modern guidance system missile performance will degrade much faster than it would in the conventional proportional navigation case.

One of the primary purposes of this invention is to ease the component tolerance requirements of Kalman, while providing a guidance scheme which is significantly improved over conventional proportional navigation. In order to achieve this result, ultimate miss distance accuracy is sacrificed to an acceptable degree in order to arrive at a system with a lower sensitivity to errors which could cause an unacceptable miss distance at the closest point of approach. Specifically, the sensitivity of this system to unmodelable errors such as radome error, is significantly reduced from Kalman systems. These errors are referred to as unmodelable because they depend upon too many factors during homing, which differ with each flight, to be specifically accounted for in the computer algorithm. These factors include look angle, frequency, beam polarization and dome temperature.

Kalman filters employ time varying gains, and therefore time varying time constants. To the extent that the present system also has time varying gains, it could be referred to as a Kalman type system. However, in Kalman the gains vary based upon recursive calculations from onboard and uplinked data. In the present guidance system the gains depend only upon time-to-go ($T_{go}$). It is for this reason, simplification of the data input requirements to the guidance computer, that this guidance scheme, as compared with Kalman, requires less fine tuning of gains, less severe component requirements and has a lower likelihood of degradation as intercept approaches, while providing much of the terminal homing accuracy one would expect from a Kalman system.

Thus the choice of gains for this system has several advantages over known systems. These advantages include: (a) gains which are much simpler to calculate than Kalman gains; (b) a noise-adaptation feature, in common with Kalman; (c) relief from the severe degradation in performance for the unmodeled errors set forth above as occurs in Kalman systems; and (d) allowance for wider system component tolerances. Additionally, through the use of such time varying gains, chosen in accordance with this invention, it is possible to employ optimal control laws to advantage. One control law applies a gain in a feed forward loop to the estimated target acceleration term to modify the control orders to the missile autopilot. Another optimal control law applies a gain to an accelerometer feedback loop from the missile autopilot and redefines the navigation ratio to compensate and account for first order autopilot time lag in addition to employing target acceleration information.

Reference material on methods of providing estimates for navigation problem values have been enumerated above. Other missile control systems with adaptive features are shown in U.S. Pat. Nos. 3,321,761, 3,575,362 and 3,911,345.

In the system of FIG. 1, body motion coupling due to radome error slope r is accounted for. At the input point the radome problem is simulated by the $1+r$ block applied to LOS angle $\sigma$ and the radome error slope r is multiplied by the airframe angle $\Psi$ and subtracted at the same input point. The radome compensation loop $K_r$, required for stabilizing the negative radome error slope, is inserted at the output rather than at the input side of the guidance filters since that enlarges the stability region for positive error slopes and for cross plane coupling slopes. Radome compensation is addressed in U.S. Pat. No. 3,316,549.

Figure 2:
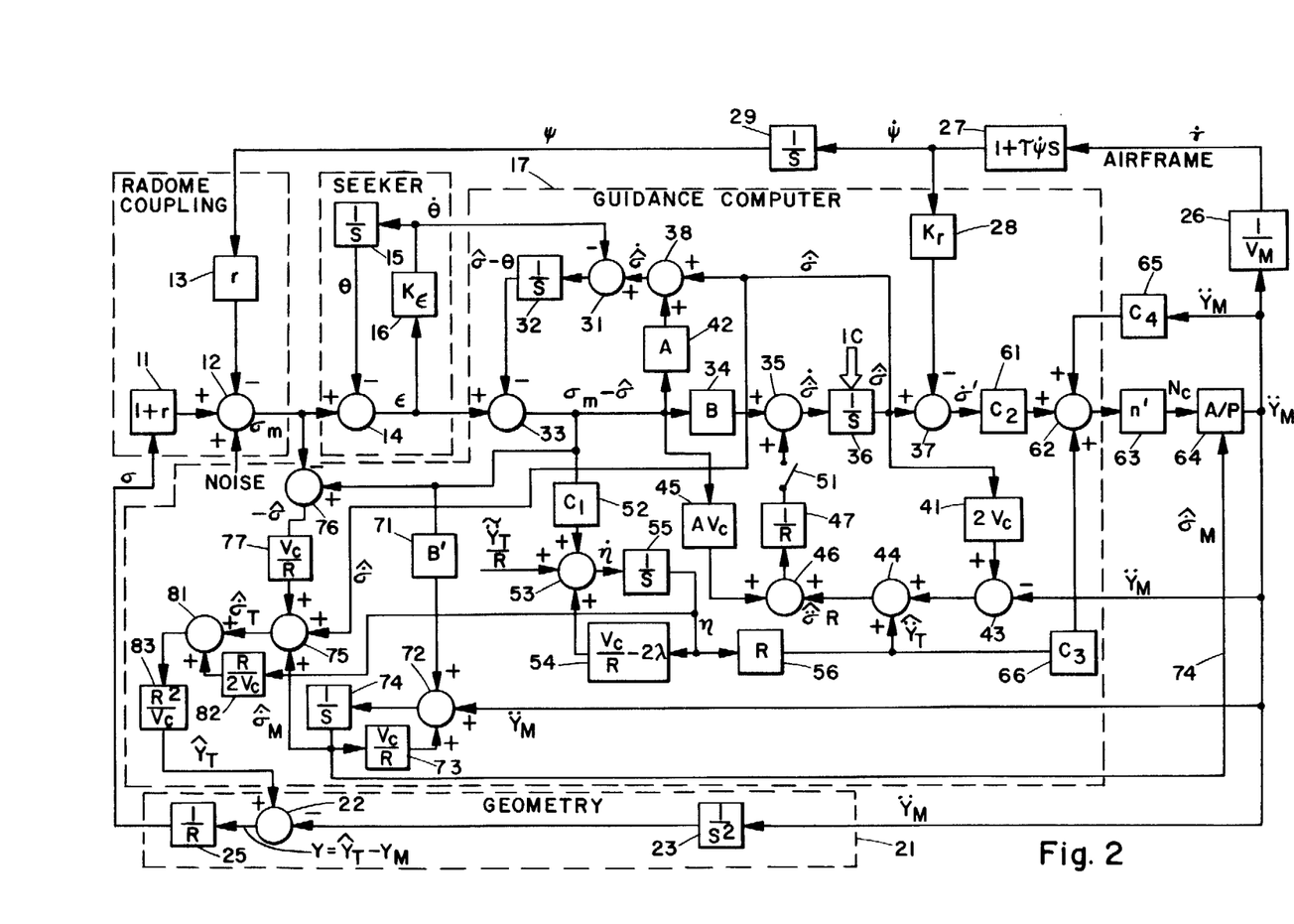
FIG. 2 is a simplified block diagram of the control dynamics of the guidance system in accordance with the present invention.

With reference now to FIG. 2, there is shown a functional block diagram of one channel of the control dynamics of a system as it operates in accordance with this invention. Note that except for a portion of the guidance computer 17, this diagram has substantial similarities to the RAFT system of FIG. 1. At the left side of the diagram is the line of sight (LOS) angle $\sigma$ input as discussed above. This input is acted upon by block 11 indicated as $1+r$, where r is the radome slope error. That thus modified LOS angle value is combined at combining point 12 with representations of the noise in the system together with $\Psi$, the missile body axis angle with respect to a reference plane, multiplied by r, again the radome slope error, in block 13. The output of combining point 12 is $\sigma_m$, a representation of the measured line of sight angle when combined with factors representing the radome error and noise in the system. This signal is then applied to combining point 14 in the seeker head track loop of the seeker section. The seeker head track loop has a $\dot{\theta}$ input, which is the rate of change, obtained from a rate gyro, of the angle $\theta$ between the antenna axis and the missile axis. The $\dot{\theta}$ signal is integrated in block 15 and the angle $\theta$ is also applied to point 14. The output of point 14, $\epsilon$, results from the fact that $\sigma_m - \theta = \epsilon$. The value $\epsilon$ is the angle between the missile-to-target LOS and the antenna electrical boresight. Block 16 multiplies the angle $\epsilon$ by the track loop gain $K_\epsilon$ and that quantity is $\dot{\theta}$ to be applied to the integrator 15 to complete the loop.

As shown in FIG. 2, one of the external inputs to guidance computer 17 is $\epsilon$, and another is $\dot{\theta}$, both shown at the upper left of the computer. Another input at the lower right side is $\ddot{Y}_M$ which is the lateral missile acceleration value from the inertial reference unit, resulting after acceleration commands have been made to the autopilot and the missile has responded. The airframe axis angle rate of change $\dot{\psi}$ provides yet another computer input at the top in FIG. 2.

As a means of arriving at LOS angle $\sigma$, the lower portion of FIG. 2 includes a geometry section 21. This portion of the block diagram is not part of the actual mechanization of the guidance system and is only facilitated to derive a geometry line of slight angle $\sigma$ as an input to the system. The lateral missile acceleration $\ddot{Y}_M$ is integrated twice as indicated by block 23 to yield the value $Y_M$ which is the lateral (vertical) displacement of the missile with respect to the LOS when evaluated at intercept. The missile displacement term is subtracted from the estimated value of target lateral displacement $\hat{Y}_T$ at combining point 22 to yield Y, the resultant combined miss distance evaluated at intercept. Thus the input to block 25 is $Y = \hat{Y}_T - Y_M$. When this quantity is divided by a simulated range value R in block 25, the result is the LOS angle $\sigma$.

Now with respect to guidance computer 17, there are two inputs to combining point 31, one of them being $\dot{\theta}$ and the other being $\dot{\hat{\sigma}}$, the output of which is $\dot{\hat{\sigma}} - \dot{\theta}$. This quantity is integrated in block 32, the output being $\hat{\sigma} - \theta$ which is applied to combining point 33 together with the input $\epsilon$. From the relationship set forth previously, $$\epsilon = \sigma_m - \theta, \tag{2}$$

we can see that the output of point 33, pursuant to the inputs just mentioned is $$\epsilon - (\hat{\sigma} - \theta) = \sigma_m - \hat{\sigma}. \tag{3}$$

The significance of equation (3) is that the output of point 33 is essentially an LOS residue value, that value being the difference between the measured LOS angle $\sigma_m$ and the estimated LOS angle $\hat{\sigma}$. It is this value to which the gains of this system are applied within the guidance computer to provide the desired results of the invention.

The LOS residue value is applied to block 34, which is the gain B, and then to combining point 35. The output of combining point 35 is applied to $\dot{\hat{\sigma}}$ integrator 36 which also has the inputs of the initial conditions (IC). The output $\hat{\sigma}$ of integrator 36 is applied to combining point 37, combining point 38 and to block 41 which multiplies by the value $2V_c$. $V_c$ is the closing speed between the missile and the target. At combining point 38 is also applied the value of the LOS residue through block 42 which is the gain A. This combination then completes the loop back to combining point 33 through combining point 31 and integrator 32.

The output of integrator 36, when multiplied by block 41, is applied to combining point 43 together with the lateral acceleration of the missile $\ddot{Y}_M$, the combination then being applied to combining point 44. The LOS residue value is also multiplied by block 45 which is $AV_c$, the output of which is applied to combining point 46 together with the output of combining point 44, which value is then divided by R in block 47, R being the range or distance between the missile and the target. The output of block 47 is connected through switch 51 back to combining point 35. Range aided filtering is accomplished by means of the feed forward loop through block 45 and the feedback loop through combining point 43, which are combined and fed through range-dividing block 47 to combining point 35.

Additionally, the LOS residue value is multiplied by gain $C_1$ in block 52, the output of which goes to combining point 53. Also applied to combining point 53, preferably uplinked from the mother ship, is the optional input $\ddot{Y}T/R$ together with the internal loop $(V_c/R) - 2\lambda$ from block 54. The output of combining point 53 is $\dot{\eta}$ which is integrated in block 55 to provide an output of $\eta$. This output goes to block 54 in a feedback fashion as well as to the range block 56, the output $\eta R = \hat{Y}_T$ being applied to combining point 44.

The LOS residue value is also multiplied by gain B' in block 71 and the output B'$(\sigma_m - \hat{\sigma})$ is applied to combining point 72, along with $\ddot{Y}_M$ from the A/P and the feedback from $V_c/R$ block 73. The output of point 72, when integrated in block 74, is the value $\hat{\sigma}_M$, the missile component of estimated LOS angle rate of change. This is an independent segment of the composite LOS rate of change $\dot{\sigma}$ or the estimated LOS rate of change $\dot{\hat{\sigma}}$, and is applied to A/P 64 through line 74. The term $\hat{\sigma}_M$ represents an estimate of the missile velocity angle perturbations. This term, decoupled from the missile-to-target LOS, provides information to the A/P for airframe control into predefined orientations for aimed warhead applications.

The target motion LOS rate estimate, $\hat{\sigma}_T$, is obtained from combining point 75. The inputs are the estimated LOS rate from integrator 36, $\dot{\hat{\sigma}}$, the missile rate $\hat{\sigma}_M$ from integrator 74, and the value $-(V_c \hat{\sigma})/R$. The last term is obtained from computer input $\sigma_m$ and LOS residue angle $\sigma_m - \hat{\sigma}$ combined at point 76 to provide $\sigma_m - \hat{\sigma} - \sigma_m = -\hat{\sigma}$, multiplied by $V_c/R$ in block 77. The target LOS rate $\hat{\sigma}_T$ is applied to combining point 81 along with the value $\eta R/2V_c$ from block 82, the output being multiplied by $R^2/V_c$ in block 83 to provide the output $\hat{Y}_T$. This term is applied to point 22 as previously stated and provides an internal estimation of the target predicted position at intercept point.

The term $\hat{\sigma}_T$ represents an estimate of the target velocity angle perturbations decoupled from the missile-to-target LOS to provide information to the missile guidance system to furnish the system with blind mode extrapolation capability during the critical period near the end of terminal guidance.

The output $\dot{\sigma}'$ of combining point 37, representing a smoothed value of the LOS rate, is applied to block 61 which multiplies the LOS rate by $C_2$ which is a gain of the optimal control law. In this case $C_2$ is $V_c$, the closing velocity between the missile and the target. The output of block 61 is applied to combining point 62 together with the $C_3$ feed forward term and the $C_4$ feedback term, both of which will be defined below. The output of point 62 is applied to block 63 which is the navigation ratio n', also defined below as part of the optimal control law. The output of block 63 is command acceleration signal $N_c$ and is applied to the autopilot represented by block 64. The IRU is included within the representation of A/P and this provides the output $\ddot{Y}_M$, which is the actual missile lateral acceleration, measured by the IRU and resulting from the missile flight response to the $N_c$ signals applied to the autopilot to operate the missile flight control surfaces.

The $\ddot{Y}_M$ term, measured by the IRU accelerometer, is fed back to point 62 through gain $C_4$ block 65. This feedback loop in part accounts for first order autopilot time lag.

Missile control or guidance laws are discussed in Warren, Price, Gelb & Vander Velde, Direct Statistical Evaluation of Nonlinear Guidance Systems, AIAA Paper No. 73-836 (AIAA Guidance and Control Conference 1973) and have been labeled A through E. While they need not be discussed in detail here, it may be helpful to note that Law A is conventional proportional navigation and corresponds to the FIG. 1 system with switch 5 open and having the two cascaded low pass filters. Law B applies also to FIG. 1 but with switch 5 closed. As thus constituted, that system employs a Kalman type filter to provide an optimal estimate of LOS rate, together with the same proportional guidance as Law A. This guidance law uses fixed gains and nulls the estimated LOS rate $\hat{\sigma}$. Both Laws C and D are optimal linear guidance laws where the guidance gains are chosen to minimize the expectation value of the square of the miss distance subject to a penalty function of the total control energy.

This system provides substantially improved terminal guidance results against maneuvering targets by employing Law C which estimates and augments the target acceleration term through gain $C_3$ block 66 into the predictive proportional navigation design, and achieves nearly optimum results against targets of the same type by employing Law D which also accounts for missile maneuvers, specifically by means of the $C_4$ acceleration feedback loop and the navigation ratio. The presently preferred embodiment of the invention incorporates Optimal Guidance Law D, but the system can operate to advantage with Law C so both are described.

The gains and navigation ratio of Law C as employed in this system are:

$$C_2 : V_c$$

$$C_3 : \frac{e^{-2\lambda_T T} + 2\lambda_T T - 1}{(2\lambda_T T)^2}$$

$$C_4 : 0$$

$$n' : \frac{3T^3}{3\gamma + T^3}$$

The applicable gains and navigation ratio of Law D in the system of this invention are:

$$C_2 : V_c$$

$$C_3 : \frac{e^{-2\lambda_T T} + 2\lambda_T T - 1}{(2\lambda_T T)^2}$$

$$C_4 : \frac{e^{-\lambda_M T} + \lambda_M T - 1}{(\lambda_M T)^2}$$

$$n' : \frac{3T^2[T - (1 - e^{-\lambda_M T})/\lambda_M]}{3\gamma + \frac{3}{2\lambda_M^3}(1 - e^{-2\lambda_M T}) + \frac{3T}{\lambda_M^2}(1 - 2e^{-\lambda_M T}) + T^2\left(T - \frac{3}{\lambda_M}\right)}$$

where
$T = \hat{T}_{go}$ (estimated time-to-go),
Y is the control effort weighting factor,
$\lambda_T$ is the target bandwidth, and
$\lambda_M$ is the bandwidth for the effective time lag in missile acceleration caused by the dynamics of the missile/autopilot combination.

These factors are defined in the Warren et al publication.

Configuration C minimizes the performance index, neglecting autopilot dynamics ($\lambda_M = \infty$), resulting in $C_4 = 0$ and $C_3$ being a function of target bandwidth $\lambda_T$. The corresponding navigation ratio reduces to a constant value of 3 if the quadratic cost function Y is neglected and reduced to zero.

Law D is derived including the first-order autopilot model dynamics, and the resulting navigation ratio n' and gain $C_4$ are both functions of $\lambda_M$ and $T_{go}$. The principal difference between Laws C and D is that in Law D, n' increases with decreasing range (for Y=0) and becomes very large near intercept to compensate for the effective lag in missile acceleration caused by the dynamics of the missile/autopilot combination. Gain $C_3$ in Law D is the same as in Law C and functions the same way.

Law E is a non-linear guidance law and is not applicable to the present system.

For both of the optimal control laws which are applicable to the scheme of FIG. 2, estimated target acceleration $\eta_R$ from block 56 is multiplied by gain $C_3$ and applied to combining point 62, together with the factors to which gains $C_2$ and $C_4$ are applied. Thus the estimated target feed forward term, the estimated LOS rate and the measured missile acceleration feedback term are combined, then multiplied by the navigation ratio to create the command acceleration signal $N_c$ by which the missile maneuvers are controlled. The ultimate control of the missile body is further a function of the estimate of missile velocity angle perturbations, $\hat{\vartheta}_M$, applied to A/P. Note that the estimated target acceleration term is used in two feed forward paths, to the guidance computer to refine the estimated LOS rate, and to the A/P to further correct in the physical control signals.

The lateral missile acceleration $\ddot{Y}_M$ output from the autopilot is also applied to block 26 and divided by the missile velocity $V_M$ which is the actual velocity of the missile through the air, independent of missile heading. The output from block 26 is $\dot{\Psi}$ which is the rate of increase of missile heading as it is changing direction to intercept the target. This missile heading rate is then operated upon by aero block 27, the output of which is $\ddot{\Psi}$, previously stated as the rate of change of the missile body axis angle. Since the radome induced error depends not only on LOS angle but also on the actual angle of the missile axis, the factor representing the rate of change of body axis angle is operated upon by block 28 which is the radome compensation factor $K_r$, and that product is then applied to combining point 37 as previously discussed. The body axis angle rate is also integrated in block 29 to provide body axis angle $\Psi$ which is then multiplied by the radome error r in block 13 and applied to combining point 12 as set forth above.

From FIGS. 1 and 2 it can be seen that the following basic relationship exists:

$$\sigma = Y/R. \tag{4}$$

Another basic relationship is useful and that is $$R = V_c T_{go} \tag{5}$$

From FIG. 2 and from equations (4) and (5) it may be seen that $$\sigma_M = \frac{\hat{Y}_T - Y_M}{V_c T_{go}}(1+r) - r\psi + \text{NOISE} \tag{6}$$

In the scheme of this invention, there are provided an estimated LOS angle $\hat{\sigma}$ and an estimated LOS rate $\hat{\dot{\sigma}}$ within the framework of the guidance system and within the capability of the person skilled in the art (see for example U.S. Pat. No. 4,148,029). If we define $\hat{\sigma}$ in terms of the estimated target lateral position $\hat{Y}_T$, we have from equation (6)

$$V_c T_{go} \hat{\sigma} = \hat{Y}_T - Y_M. \tag{7}$$

The LOS rate equation, where the dot indicates time differentiation and $\dot{T}_{go} = -1$ is defined to be $$V_c T_{go} \hat{\dot{\sigma}} - V_c \sigma = \hat{\dot{Y}}_T - \dot{Y}_M. \tag{8}$$

The well-known Hanson's third order tracker can be described by the following equations:

$$\hat{Y}_T = \hat{\dot{Y}}_T + A(Y_T - \hat{Y}_T) \tag{9}$$

$$\hat{\dot{Y}}_T = \ddot{Y}_T + B(Y_T - \hat{Y}_T) \tag{10}$$

and $$\hat{\ddot{Y}}_T = -2\lambda \ddot{Y}_T + C_1(Y_T - \hat{Y}_T). \tag{11}$$

Equation 11 assumes a band-limited target acceleration model with bandwidth $2\lambda$. One further relationship useful for defining $\theta$, the LOS rate due only to target acceleration, is $$\theta = \hat{\ddot{Y}}_T / V_c T_{go} \tag{12}$$

By using equations (6)–(12) we can write the following fourth order filter equations of the block diagram of FIG. 2 with A, B, B' and $C_1$ as the filter gains based on the LOS measurement data.

$$\hat{\sigma} = \hat{\dot{\sigma}} + A(\sigma_m - \hat{\sigma}) \tag{13}$$

$$\hat{\dot{\sigma}} = \eta + \frac{2\hat{\dot{\sigma}}}{T_{go}} - \frac{\ddot{y}_M}{V_c T_{go}} + \left(B + \frac{A}{T_{go}}\right)(\sigma_m - \hat{\sigma}) \tag{14}$$

$$\hat{\dot{\sigma}}_M = \frac{\hat{\sigma}_M}{T_{go}} + \frac{\ddot{y}_M}{V_c T_{go}} + B'(\sigma_m - \hat{\sigma}) \text{ and} \tag{15}$$

$$\dot{\eta} = \left(\frac{1}{T_{go}} - 2\lambda\right)\eta + \frac{\overline{\ddot{y}}_T}{V_c T_{go}} + C_1(\sigma_m - \hat{\sigma}). \tag{16}$$

It should be noted that each of equations (13)–(16) has a prediction term and a correction term. The correction term in these equations is that term which includes the residual LOS measurement, $\sigma_m - \hat{\sigma}$, and the predictive portion of each equation is the remainder. These equations show the components which make up the LOS angle $\sigma$ and the LOS rate $\dot{\sigma}$ estimations.

In this fourth order scheme, not only are LOS angle $\hat{\sigma}$, miss distance $\hat{Y}$ and target acceleration $\hat{\ddot{Y}}_T$ estimated, but so are missile and target lateral velocity $\hat{\dot{Y}}_M$ and $\hat{\dot{Y}}_T$, respectively. The $\hat{\dot{Y}}_T$ estimates provide the necessary target lateral velocity information, decoupled from the missile component so that advantage can be taken of the built-in Kalman-type prediction capability for a blind mode situation in the end game. The $\hat{\dot{Y}}_M$ estimates can be used for deriving body angle information for the case of small angle of attack and a fast response autopilot. Thus this four-state estimator can supply the airframe control information for guidance into predefined orientations to aid in fuzing and detonation for aimed warheads.

For small perturbations in lateral velocity angles, the target and missile velocity terms can be expressed as $$\hat{\dot{Y}}_T = V_T(\cos \gamma_{TO})\hat{\gamma}_T = V_T C_T \hat{\gamma}_T \tag{17}$$

and $$\hat{\dot{Y}}_M = V_M(\cos \gamma_{MO})\hat{\gamma}_M = V_M C_M \hat{\gamma}_M \tag{18}$$

where $C_T$ and $C_M$ are the directional cosines of the target and missile velocity angles measured from the LOS direction, $V_T$ and $V_M$ are the respective target and missile velocities, and $\hat{\gamma}_T$ and $\hat{\gamma}_M$ are the estimated velocity angles. $\gamma_{TO}$ and $\gamma_{MO}$ are the respective velocity angles at the beginning of homing.

The definition of LOS rate estimate can be derived by rewriting equation (8) as $$\hat{\dot{\sigma}}_T = \hat{\dot{\sigma}} + \hat{\dot{\sigma}}_M - (\hat{\sigma}/T_{go}). \tag{19}$$

From this equation, providing the relationship between estimated LOS rate $\hat{\dot{\sigma}}$ and the estimated target and missile LOS rate components, $\hat{\dot{\sigma}}_T$ and $\hat{\dot{\sigma}}_M$ respectively, we can determine from equations (13)–(16) all that the guidance system needs to known to employ decoupled position and rate components. The estimated target and missile LOS rate components are defined as:

$$\hat{\dot{\sigma}}_T = \frac{V_T C_T}{V_c T_{go}} \hat{\gamma}_T \text{ and} \tag{20}$$

-continued $$\hat{\sigma}_M = \frac{V_M C_M}{V_c T_{go}} \hat{\gamma}_M. \tag{21}$$

It can be seen that these LOS rate components are proportional to the lateral velocity angle perturbations. $V_c$ is the closing speed along the LOS and $$V_c = V_M C_M - V_T C_T \tag{22}$$

As stated previously, it is desirable to provide a significant improvement within the confines of the prior art guidance computer of the type shown in FIG. 1. In analyzing FIG. 2, if switch 51 is open, all of the range uplink dependent terms are disconnected so that the guidance computer itself can be reduced to $$\frac{N_c}{\dot{\sigma}_m} = \frac{A V_c S}{1 + \frac{A}{B} S + \frac{S^2}{B}} \tag{23}$$

which is a second order filtering with complex pole. In order for the guidance filter to be conformed to the conventional $\tau_d$ and $\tau_c$ cascaded filters with two real roots of the type shown in FIG. 1, the filter gains are chosen as follows:

$$A = (1/\tau_d) + (1/\tau_c) \tag{24}$$

$$B = 1/(\tau_d \tau_c) \tag{25}$$

where $\tau_d$ and $\tau_c$ are the varying time constants for the known adaptive guidance $\alpha_d$ and $\alpha_c$ filters and are computed and employed within the guidance system of which the present invention is an improvement. Upon differentiating and substituting equations (24) and (25) into equation (23), we have $$\frac{N_c}{\dot{\sigma}_m} = \frac{A V_c}{(1 + \tau_d S)(1 + \tau_c S)} \tag{26}$$

Figure 3:
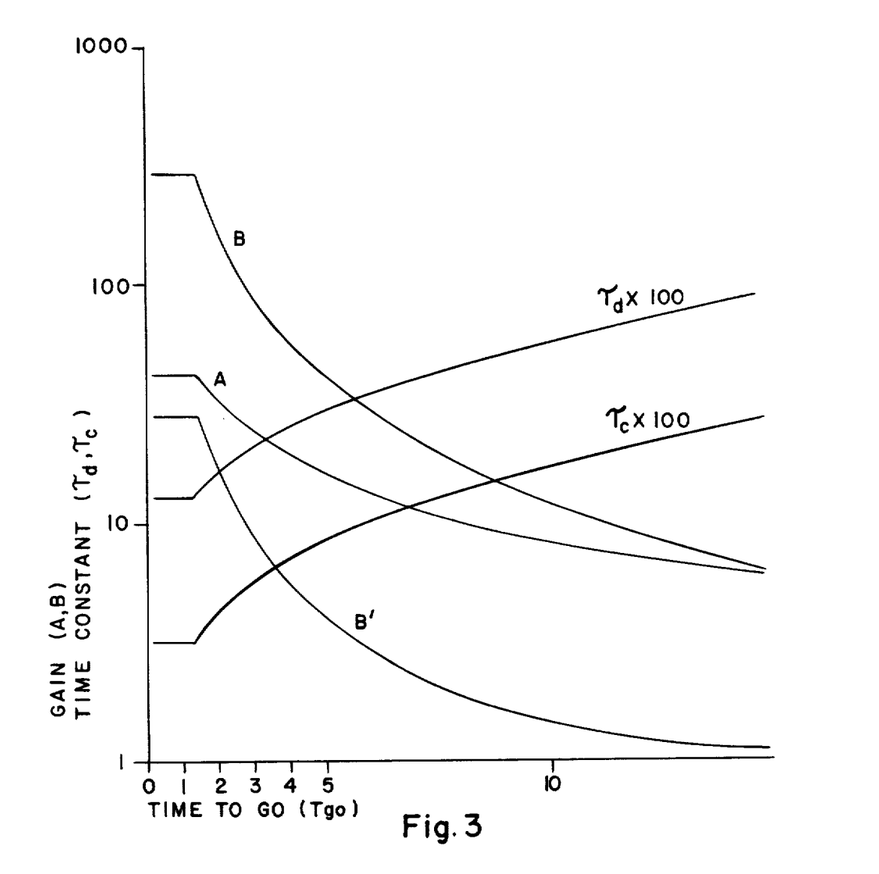
FIG. 3 is a graph with the noise adaptive gains A, B, B' and time constants $\tau_d$, $\tau_c$ plotted against time-to-go.

It will be noted that equation (26) is identical with equation (1) indicating that with switch 51 open, the guidance computer of FIG. 2 has a configuration where the transfer function is the same as that of the previous scheme shown in FIG. 1. However, in this instance, gains A and B have been chosen to vary to reflect the noise adaptive feature of the system, as shown in FIG. 3.

In the early stage of homing, gains A and B are very small so that heavy noise will not get through the filter. As intercept approaches and the signal-to-noise ratio becomes larger, the filters are gradually opened up by allowing almost exponentially increasing gains as a function of time-to-go. Due to seeker head non-linearities, head-aero loop stability and radome loop stability considerations, gains A and B cannot be allowed to go to infinitely large values at intercept. A ceiling is imposed that reflects the characteristics of the floor in the guidance time constants. The floor of the time constants plays a very important role since the nearly linearly decreasing time constant reaches the floor near a few total system time-constants-to-go. This is in the vicinity of the critical region which determines 90% of the missile performance. The error-inducing noises and bias beyond this critical time occur too early to have a significant effect upon performance since the transient response will die out in a few time constants, while the induced disturbances, at times very close to intercept, are too late for the missile to react and can essentially be ignored. Even though the choice of varying filter gains A and B is slightly sub-optimal compared with the choice of Kalman gains, as stated before a Kalman filtering scheme imposes more severe requirements upon component tolerances. Furthermore, this choice for the gains A and B has advantages in that it is simpler to calculate than Kalman gains while it has already exploited a noise-adaptation feature and will not suffer the severe degradation in performance for the unmodeled errors such as the radome problem and glint noise, among others.

The fourth order filter gain B' has been chosen to be proportional to gain B so it is also noise adaptive and has the other characteristics of gains A and B described above. Thus the equation for this gain is $$B' = KB = K\frac{1}{\tau_d \tau_c} \tag{27}$$

Acceptable results have been obtained with $K \sim 0.1$.

In the guidance computer, the $\hat{\sigma}$ integrator 36 is initialized for heading error at the start of homing and for other conditions which can be set prior to the terminal guidance phase of the missile.

Figure 4:
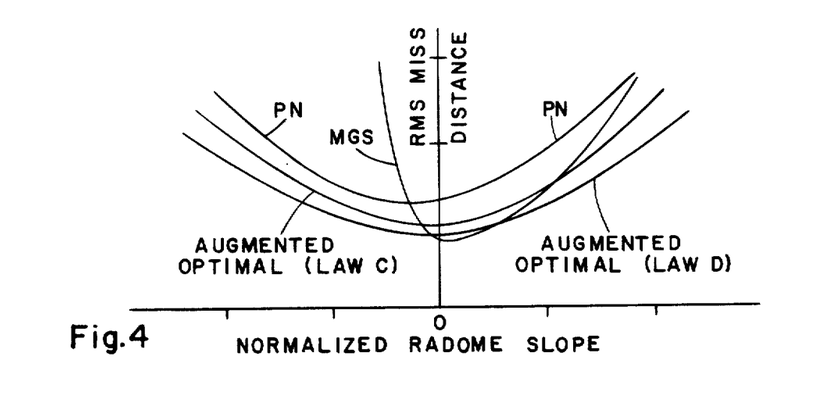
FIG. 4 is a sensitivity graph with RMS miss distance plotted against radome slope for the present invention and for prior art systems.

The sensitivity of this system is shown in FIG. 4, in comparison with conventional proportional navigation and a modern guidance system (MGS), usually referred to as a Kalman system. Note that MGS provides a miss distance at zero or slightly positive radome slope which is better than proportional navigation. However, it is evident from FIG. 4 that the MGS has a high sensitivity to radome error and, as stated earlier, such unmodeled errors cause accelerated degradation of such a guidance system. The conventional proportional navigation system is substantially less sensitive and relatively symmetrical about zero radome slope. Some of the advantages of the present system are readily apparent from FIG. 4 in that the Law C curve shows somewhat less sensitivity to radome error and at the same time it improves miss distance with respect to conventional proportional navigation and is nearly as good as MGS. The Law D curve shows substantially less sensitivity to radome error and an even better miss distance than with Law C, being not appreciably different from MGS. The fact that this invention has less sensitivity to the unmodeled radome error indicates that it is substantially more robust than the MGS scheme. The curves of FIG. 4 include RMS miss due to step target maneuvering, revealing that this system, with gains chosen as set forth herein, makes good use of optimal control laws and yields nearly optimal performance with a wider body motion coupling stability region than is true of MGS.

In addition to the range aided filtering already discussed, gain $C_1$ is chosen to be adaptive to the boresight error noise level and varies inversely proportional to $\tau_d$. The manner in which gain $C_1$ varies enables the system of FIG. 2 to achieve optimal performance for both problems of maneuvering targets and radome body-motion coupling with additional range aided filtering and further prediction terms. By varying gain parameters A, B, B' and $C_1$ adaptively to the noise input, it is possible to optimize the guidance accuracy tradeoff between maneuvering target acceleration and radome body motion coupling disturbances. With the $\hat{\gamma}_T$ input to combining point 44, the output of that combining point is $\hat{\sigma}R$, the acceleration prediction term desirable for providing efficient interception of maneuvering targets. As indicated in FIG. 4, this system with the addition of an optimal control law has a sensitivity (including target maneuvering) somewhat better than conventional proportional navigation and a substantially better miss distance performance. Conventional proportional navigation does not have prediction terms in its guidance computer and is not very effective against maneuvering targets, but the fourth order scheme of the present invention has all of the advantages of the conventional proportional navigation with respect to radome error while at the same time providing improvement in performance against maneuvering targets. By decoupling target and missile motion and using that information to create further predictive terms, the system is able to overcome such problems as jamming near intercept, and can increase the kill probability when the missile velocity angle is predicted and employed in aimed warhead applications. With the addition of uplink information from the mother ship of target acceleration (the term $\ddot{Y}_T/V_cT_{go}$ at combining point 53) further information is provided to improve system performance.

I claim:

1. A method for terminal guidance of a missile to intercept a target, said method being a fourth order scheme employing a predictive proportional navigation system including an autopilot, an inertial reference unit (IRU) and a noise adaptive guidance computer, said system including noise and radome error compensation, said computer having an adaptive guidance filtering system, said proportional navigation system having input values for the range R and the closing velocity $V_c$ between missile and target, line of sight (LOS) angle $\sigma$, antenna electrical boresight error angle $\epsilon$, angle $\theta$ between the antenna axis and the missile axis, the rate of change $\dot{\theta}$ of the angle $\theta$, and time varying noise-adaptive time constants $\tau_d$ and $\tau_c$, where $\epsilon = \sigma_m - \theta$, said system deriving a value of LOS angle $\sigma_m$, an estimate of LOS angle $\hat{\sigma}$ and a residual LOS angle $\sigma_m - \hat{\sigma}$, the output of said filtering system being a smoothed line of sight rate $\hat{\dot{\sigma}}$, actual missile lateral acceleration being detected by said IRU, the output of said IRU being a measure of actual lateral acceleration $\ddot{Y}_M$, said method comprising the steps of:

applying the boresight error angle $\epsilon$ to a first combining point;

multiplying the residual LOS angle output from said first combining point by a gain A to provide the value $A(\sigma_m - \hat{\sigma})$;

combining the value $A(\sigma_m - \hat{\sigma})$ with the LOS rate $\hat{\dot{\sigma}}$ at a second combining point to provide an estimated LOS rate $\hat{\dot{\sigma}}$;

combining said estimated LOS rate $\hat{\dot{\sigma}}$ with said rate $\dot{\sigma}$ to provide the value $\hat{\dot{\sigma}} - \dot{\sigma}$;

integrating the value $\hat{\dot{\sigma}} - \dot{\sigma}$ to provide $\hat{\sigma} - \theta$;

feeding back the value $\hat{\sigma} - \theta$ to said first combining point;

combining said value $\hat{\sigma} - \theta$ with the angle $\epsilon$ to provide the value $\sigma_m - \hat{\sigma}$ at the input to said filtering system;

multiplying the residual LOS angle by a gain B to provide the value $B(\sigma_m - \hat{\sigma})$;

multiplying the LOS rate $\hat{\dot{\sigma}}$ by $2V_c$;

combining said multiplied LOS rate with acceleration term $\ddot{Y}_M$ at a third combining point to provide the term $2V_c\hat{\dot{\sigma}} - \ddot{Y}_M$;

feeding back said term $2V_c\hat{\dot{\sigma}} - \ddot{Y}_M$ to a fourth combining multiplying the residual LOS angle by $AV_c$ to provide the value $AV_c(\sigma_m - \hat{\sigma})$;

feeding forward said value $AV_c(\sigma_m - \hat{\sigma})$ to a fifth combining point;

multiplying the residual LOS angle by a gain $C_1$ to provide the term $C_1(\sigma_m - \hat{\sigma})$;

combining the term $C_1(\sigma_m - \hat{\sigma})$ with target acceleration and range input values to provide an estimated target lateral acceleration value $\hat{\ddot{Y}}_T$;

feeding forward said value $\hat{\ddot{Y}}_T$ to said fourth combining point;

combining $\hat{\ddot{Y}}_T$ with the value $2V_c\hat{\dot{\sigma}} - \ddot{Y}_M$ at said fourth combining point to provide an estimated LOS acceleration term $\hat{\ddot{\sigma}}R$;

combining the values $AV_c(\sigma_m - \hat{\sigma})$ and $\hat{\ddot{\sigma}}R$ at said fifth combining point to provide the value $$2V_c\hat{\dot{\sigma}} - \ddot{Y}_M + \hat{\ddot{Y}}_T + AV_c(\sigma_m - \hat{\sigma});$$

dividing the immediately preceding value by the range R to provide the value $$\eta + \frac{2\hat{\dot{\sigma}}}{T_{go}} - \frac{\ddot{Y}_M}{V_cT_{go}} + \frac{A}{T_{go}}(\sigma_m - \hat{\sigma});$$

combining the immediately preceding value with the value $B(\sigma_m - \hat{\sigma})$ at a sixth combining point to provide the corrective and predictive term $$\hat{\ddot{\sigma}} = \eta + \frac{2\hat{\dot{\sigma}}}{T_{go}} - \frac{\ddot{Y}_M}{V_cT_{go}} + \left(B + \frac{A}{T_{go}}\right)(\sigma_m - \hat{\sigma}); \text{ then}$$

integrating the term $\hat{\ddot{\sigma}}$ to provide the smoothed LOS rate $\hat{\dot{\sigma}}$;

multiplying the residual LOS angle by gain B' to provide the term $B'(\sigma_m - \hat{\sigma})$;

combining $B'(\sigma_m - \hat{\sigma})$ with missile lateral acceleration value $\ddot{\sigma}_M$ and missile velocity estimate $\hat{\dot{\sigma}}_m V_c/R$ at an eighth combining point to provide the output term $$\frac{\hat{\dot{\sigma}}_m V_c}{R} - \ddot{\gamma}_M + B'(\sigma_m - \sigma);$$

integrating the immediately preceding value to provide the estimated missile LOS rate component $\hat{\dot{\sigma}}_M$;

applying said LOS rate estimate $\hat{\dot{\sigma}}_M$ to said autopilot to provide body angle information;

combining said LOS estimated rate $\hat{\dot{\sigma}}$ in a ninth combining point with missile LOS rate $\hat{\dot{\sigma}}_M$ and a function of estimated LOS $-\hat{\sigma}V_c/R$ to provide the output $\hat{\dot{\sigma}}_T$, the target estimated LOS rate component;

combining said target LOS rate component in a tenth combining point with a function of change in LOS rate due to target acceleration $\rho R/2V_c$;

multiplying the output of said tenth combining point by $R^2/V_c$ to provide the estimated target lateral displacement $\hat{Y}_T$;

twice integrating said missile lateral acceleration term $\ddot{Y}_M$ to provide missile lateral displacement $Y_M$;

combining said target and missile lateral displacements in an eleventh combining point to provide the miss distance Y evaluated at intercept, $Y = Y_T - Y_M$;

dividing said miss distance Y by range R to provide system input, LOS angle $\sigma$;

gains A, B, B' and $C_1$ are noise-adaptive and dependent upon time-to-go, while the guidance filter output $\hat{\sigma}$ is also range dependent and includes both corrective and predictive terms; where $$A = (1/\tau_d) + (1/\tau_c),$$

$$B = 1/(\tau_d \tau_c),$$

and $$B' = KB,$$

and $C_1$ noise adaptively varies inversely proportional to $\tau_d$;

multiplying a function of said guidance filter output $\hat{\sigma}$ by a gain $C_2$ and applying that product to a seventh combining point;

multiplying the estimated target lateral acceleration term $\hat{Y}_T$ by a gain $C_3$ which is a function of target bandwidth $\lambda_T$ and $T_{go}$, the value $C_3\hat{Y}_T$ being fed forward to said seventh combining point;

multiplying said seventh combining point output $C_3\hat{Y}_T + C_2\hat{\sigma}$ by the navigation ratio n' which is a function of control effort weighting factor $\gamma$ and $T_{go}$; and applying the immediately preceding term to said autopilot as command acceleration to modify the position of the missile control surfaces and to account for target lateral acceleration, employing optimal guidance Law C to define gains $C_2$ and $C_3$ and navigation ratio n', thereby providing nearly optimal miss distance and low sensitivity to radome error.

2. A method for terminal guidance of a missile to intercept a target, said method being a fourth order scheme employing a predictive proportional navigation system including an autopilot, an inertial reference unit (IRU) and a noise adaptive guidance computer, said system including noise and radome error compensation, said computer having an adaptive guidance filtering system, said proportional navigation system having input values for the range R and the closing velocity $V_c$ between missile and target, line of sight (LOS) angle $\sigma$, antenna electrical boresight error angle $\epsilon$, angle $\theta$ between the antenna axis and the missile axis, the rate of change $\dot{\theta}$ of the angle $\theta$, and time varying noise-adaptive time constants $\tau_d$ and $\tau_c$, where $\epsilon = \sigma_m - \theta$, said system deriving a value of LOS angle $\sigma_m$, an estimate of LOS angle $\hat{\sigma}$ and a residual LOS angle $\sigma_m - \hat{\sigma}$, the output of said filtering system being a smoothed line of sight rate $\hat{\sigma}$, actual missile lateral acceleration being detected by said IRU, the output of said IRU being a measure of actual lateral acceleration $\ddot{Y}_M$, said method comprising the steps of:

applying the boresight error angle $\epsilon$ to a first combining point;

multiplying the residual LOS angle output from said first combining point by a gain A to provide the value $A(\sigma_m - \hat{\sigma})$;

combining the value $A(\sigma_m - \hat{\sigma})$ with the LOS rate $\hat{\sigma}$ at a second combining point to provide an estimated LOS rate $\hat{\sigma}$;

combining said estimated LOS rate $\hat{\sigma}$ with said rate $\dot{\theta}$ to provide the value $\hat{\sigma} - \dot{\theta}$;

integrating the value $\hat{\sigma} - \dot{\theta}$ to provide $\hat{\sigma} - \theta$;

feeding back the value $\hat{\sigma} - \theta$ to said first combining point;

combining said value $\hat{\sigma} - \theta$ with the angle $\epsilon$ to provide the value $\sigma_m - \hat{\sigma}$ at the input to said filtering system;

multiplying the residual LOS angle by a gain B to provide the value $B(\sigma_m - \hat{\sigma})$;

multiplying the LOS rate $\hat{\sigma}$ by $2V_c$;

combining said multiplied LOS rate with acceleration term $\ddot{Y}_M$ at a third combining point to provide the term $2V_c\hat{\sigma} - \ddot{Y}_M$;

feeding back said term $2V_c\hat{\sigma} - \ddot{Y}_M$ to a fourth combining point;

multiplying the residual LOS angle by $AV_c$ to provide the value $AV_c(\sigma_m - \hat{\sigma})$;

feeding forward said value $AV_c(\sigma_m - \hat{\sigma})$ to a fifth combining point;

multiplying the residual LOS angle by a gain $C_1$ to provide the term $C_1(\sigma_m - \hat{\sigma})$;

combining the term $C_1(\sigma_m - \hat{\sigma})$ with a value $$\eta\left(\frac{V_c}{R} - 2\lambda\right)$$

at a twelfth combining point to provide a value $\dot{\eta}$;

integrating the value $\dot{\eta}$ to provide the value $\eta$, the LOS rate due to target acceleration;

multiplying $\eta$ by $(V_c/R) - 2\lambda$ in a feedback loop and applying $$\eta\left(\frac{V_c}{R} - 2\lambda\right)$$

to said twelfth combining point;

multiplying $\eta$ by R to provide an estimated target lateral acceleration value $\ddot{Y}_T$;

combining $\ddot{Y}_T$ with the value $2V_c\hat{\sigma} - \ddot{Y}_M$ at said fourth combining point to provide an estimated LOS acceleration term $\hat{\sigma}_R$;

combining the values $AV_c(\sigma_m - \hat{\sigma})$ and $\hat{\sigma}R$ at said fifth combining point to provide the value $$2V_c\hat{\sigma} - \ddot{Y}_M + \ddot{Y}_T + AV_c(\sigma_m - \hat{\sigma});$$

dividing the immediately preceding value by the range R to provide the value $$\eta + \frac{2\hat{\sigma}}{T_{go}} - \frac{\ddot{y}_M}{V_c T_{go}} + \frac{A}{T_{go}}(\sigma_m - \hat{\sigma});$$

combining the immediately preceding value with the value $B(\sigma_m - \hat{\sigma})$ at a sixth combining point to provide the corrective and predictive term $$\dot{\hat{\sigma}} = \eta + \frac{2\hat{\sigma}}{T_{go}} - \frac{\ddot{y}_M}{V_c T_{go}} + \left(B + \frac{A}{T_{go}}\right)(\sigma_m - \hat{\sigma}); \text{ then}$$

integrating the term $\dot{\hat{\sigma}}$ to provide the smoothed LOS rate $\hat{\sigma}$;

multiplying the residual LOS angle by gain B' to provide the term $B'(\sigma_m - \hat{\sigma})$;

combining $B'(\sigma_m - \hat{\sigma})$ with missile lateral acceleration value $\ddot{Y}_M$ and missile velocity estimate $\hat{\sigma}_M V_c/R$ at an eighth combining point to provide the output term $$\frac{\hat{\sigma}_M V_c}{R} - \ddot{Y}_M + B'(\sigma_m - \hat{\sigma});$$

integrating the immediately preceding value to provide the estimated missile LOS rate component $\hat{\sigma}_M$;

applying said LOS rate estimate $\hat{\sigma}_M$ to said autopilot to provide body angle information;

combining said LOS estimated rate $\hat{\sigma}$ in a ninth combining point with missile LOS rate $\hat{\sigma}_M$ and a function of estimated LOS $-\hat{\sigma}V_c/R$ to provide the output $\hat{\sigma}_T$, the target estimated LOS rate component;

combining said target LOS rate component in a tenth combining point with a function of change in LOS rate due to target acceleration $\eta R/2V_c$;

multiplying the output of said tenth combining point by $R^2/V_c$ to provide the estimated target lateral displacement $Y_T$;

twice integrating said missile lateral acceleration term $\ddot{Y}_M$ to provide missile lateral displacement $Y_M$;

combining said target and missile lateral displacements in an eleventh combining point to provide the miss distance Y evaluated at intercept, $Y = Y_T - Y_M$;

dividing said miss distance Y by range R to provide system input, LOS angle $\sigma$;

gains A, B, B' and $C_1$ are noise-adaptive and dependent on time-to-go, while the guidance filter output $\hat{\sigma}$ is also range dependent and includes both corrective and predictive terms; where $A = (1/\tau_d) + (1/\tau_c),$ $B = 1/\tau_d \tau_c,$ and $B' = KB,$ and $C_1$ noise adaptively varies inversely proportional to $\tau_d$;

multiplying a function of said guidance filter output $\hat{\sigma}$ by a gain $C_2$ and applying that product to a seventh combining point;

multiplying the estimated target lateral acceleration term $\hat{Y}_T$ by a gain $C_3$ which is a function of target bandwidth $\lambda_T$ and $T_{go}$, the value $C_3 \hat{Y}_T$ being fed forward to said seventh combining point;

multiplying said seventh combining point output $C_3 \hat{Y}_T + C_2 \hat{\sigma}$ by the navigation ratio n' which is a function of control effort weighting factor $\gamma$ and $T_{go}$; and applying the immediately preceding term to said autopilot as command acceleration to modify the position of the missile control surfaces and to account for target lateral acceleration, employing optimal guidance Law C to define gains $C_2$ and $C_3$ and navigation ratio n', thereby providing nearly optimal miss distance and low sensitivity to radome error.

3. A method for terminal guidance of a missile to intercept a target, said method being a fourth order scheme employing a predictive proportional navigation system including an autopilot, an inertial reference unit (IRU) and a noise adaptive guidance computer, said system including noise and radome error compensation, said computer having an adaptive guidance filtering system, said proportional navigation system having input values for the range R and the closing velocity $V_c$ between missile and target, line of sight (LOS) angle $\sigma$, antenna electrical boresight error angle $\epsilon$, angle $\theta$ between the antenna axis and the missile axis, the rate of change $\dot{\theta}$ of the angle $\theta$, and time varying noise-adaptive time constants $\tau_d$ and $\tau_c$, where $\epsilon = \sigma_m - \theta$, said system deriving a value of LOS angle $\sigma_m$, an estimate of LOS angle $\hat{\sigma}$ and a residual LOS angle $\sigma_m - \hat{\sigma}$, the output of said filtering system being a smoothed line of sight rate $\hat{\sigma}$, actual missile lateral acceleration being detected by said IRU, the output of said IRU being a measure of actual lateral acceleration $\ddot{Y}_M$, said method comprising the steps of:

applying the boresight error angle $\epsilon$ to a first combining point;

multiplying the residual LOS angle output from said first combining point by a gain A to provide the value $A(\sigma_m - \hat{\sigma})$;

combining the value $A(\sigma_m - \hat{\sigma})$ with the LOS rate $\hat{\sigma}$ at a second combining point to provide an estimated LOS rate $\hat{\dot{\sigma}}$;

combining said estimated LOS rate $\hat{\dot{\sigma}}$ with said rate $\dot{\theta}$ to provide the value $\hat{\dot{\sigma}} - \dot{\theta}$;

integrating the value $\hat{\dot{\sigma}} - \dot{\theta}$ to provide $\hat{\sigma} - \theta$;

feeding back the value $\hat{\sigma} - \theta$ to said first combining point;

combining said value $\hat{\sigma} - \theta$ with the angle $\epsilon$ to provide the value $\sigma_m - \hat{\sigma}$ at the input to said filtering system;

multiplying the residual LOS angle by a gain B to provide the value $B(\sigma_m - \hat{\sigma})$;

multiplying the LOS rate $\hat{\sigma}$ by $2V_c$;

combining said multiplied LOS rate with acceleration term $\ddot{Y}_M$ at a third combining point to provide the term $2V_c \hat{\sigma} - \ddot{Y}_M$;

feeding back said term $2V_c \hat{\sigma} - \ddot{Y}_M$ to a fourth combining point;

multiplying the residual LOS angle by $AV_c$ to provide the value $AV_c (\sigma_m - \hat{\sigma})$;

feeding forward said value $AV_c (\sigma_m - \hat{\sigma})$ to a fifth combining point;

multiplying the residual LOS angle by a gain $C_1$ to provide the term $C_1 (\sigma_m - \hat{\sigma})$;

combining the term $C_1 (\sigma_m - \hat{\sigma})$ with target acceleration and range input values to provide an estimated target lateral acceleration value $\hat{Y}_T$;

feeding forward said value $\hat{Y}_T$ to said fourth combining point;

combining $\hat{Y}_T$ with the value $2V_c \hat{\sigma} - \ddot{Y}_M$ at said fourth combining point to provide an estimated LOS acceleration term $\ddot{\hat{\sigma}} R$;

combining the values $AV_c (\sigma_m - \sigma)$ and $\ddot{\hat{\sigma}} R$ at said fifth combining point to provide the value $$2V_c \hat{\sigma} - \ddot{Y}_M + \hat{Y}_T + AV_c(\sigma_m - \hat{\sigma});$$

dividing the immediately preceding value by the range R to provide the value $$\eta + \frac{2\hat{\sigma}}{T_{go}} - \frac{\ddot{Y}_M}{V_c T_{go}} + \frac{A}{T_{go}} (\sigma_m - \hat{\sigma});$$

combining the immediately preceding value with the value $B(\sigma_m - \hat{\sigma})$ at a sixth combining point to provide the corrective and predictive term $$\dot{\hat{\sigma}} = \eta + \frac{2\hat{\sigma}}{T_{go}} - \frac{\ddot{y}_M}{V_c T_{go}} + \left(B + \frac{A}{T_{go}}\right)(\sigma_m - \hat{\sigma}); \text{ then}$$

integrating the term $\dot{\hat{\sigma}}$ to provide the smoothed LOS rate $\hat{\sigma}$;
multiplying the residual LOS angle by gain $B'$ to provide the term $B'(\sigma_m - \hat{\sigma})$;
combining $B'(\sigma_m - \hat{\sigma})$ with missile lateral acceleration value $\ddot{Y}_M$ and missile velocity estimate $(\hat{\sigma}_M V_c)/R$ at an eighth combining point to provide the output term $$\frac{\hat{\sigma}_M V_c}{R} - \ddot{y}_M + B'(\sigma_m - \hat{\sigma});$$

integrating the immediately preceding value to provide the estimated missile LOS rate component $\hat{\sigma}_M$;
applying said LOS rate estimate $\hat{\sigma}_M$ to said autopilot to provide body angle information;
combining said LOS estimated rate $\hat{\sigma}$ in a ninth combining point with missile LOS rate $\hat{\sigma}_M$ and a function of estimated LOS $-(\hat{\sigma}V_c)/R$ to provide the output $\hat{\sigma}_T$, the target estimated LOS rate component;
combining said target LOS rate component in a tenth combining point with a function of change in LOS rate due to target acceleration $\eta R/2V_c$;
multiplying the output of said tenth combining point by $R^2/V_c$ to provide the estimated target lateral displacement $Y_T$;
twice integrating said missile lateral acceleration term $\ddot{Y}_M$ to provide missile lateral displacement $Y_M$;
combining said target and missile lateral displacements in an eleventh combining point to provide the miss distance Y evaluated at intercept, $Y = Y_T - Y_M$;
dividing said miss distance Y by range R to provide system input, LOS angle $\sigma$;
gains A, B, B' and $C_1$ are noise-adaptive and dependent upon time-to-go, while the guidance filter output $\hat{\sigma}$ is also range dependent and includes both corrective and predictive terms; where $$A = (1/\tau_d) + (1/\tau_c),$$

$$B = 1/\tau_d \tau_c,$$

and $$B' = KB.$$

and $C_1$ noise adaptively varies inversely proportional to $\tau_d$;
multiplying a function of said guidance filter output $\hat{\sigma}$ by a gain $C_2$ and applying that product to a seventh combining point;
multiplying the estimated target lateral acceleration term $\ddot{Y}_T$ by a gain $C_3$ which is a function of target bandwidth $\lambda_T$ and $T_{go}$, the value $C_3 \ddot{Y}_T$ being fed forward to said seventh combining point;
multiplying the missile lateral acceleration term $\ddot{Y}_M$ by a gain $C_4$ which is a function of autopilot dynamics $\lambda_M$ and $T_{go}$, the value $C_4 \ddot{Y}_M$ being fed back to said seventh combining point;
multiplying said seventh combining point output $C_4 \ddot{Y}_M + C_2 \hat{\sigma} + C_3 \ddot{Y}_T$ by the navigation ratio n' which is also a function of autopilot dynamics and $T_{go}$; and
applying the immediately preceding term to said autopilot as command acceleration to modify the position of the missile control surfaces and to account for target lateral acceleration and first order autopilot time lag, employing optimal guidance Law D to define gains $C_2$, $C_3$ and $C_4$ and navigation ratio n', thereby providing nearly optimal miss distance and low sensitivity to radome error.

4. A method for terminal guidance of a missile to intercept a target, said method being a fourth order scheme employing a predictive proportional navigation system including an autopilot, an inertial reference unit (IRU) and a noise adaptive guidance computer, said system including noise and radome error compensation, said computer having an adaptive guidance filtering system, said proportional navigation system having input values for the range R and the closing velocity $V_c$ between missile and target, line of sight (LOS) angle $\sigma$, antenna electrical boresight error angle $\epsilon$, angle $\theta$ between the antenna axis and the missile axis, the rate of change $\dot{\theta}$ of the angle $\theta$, and time varying noise-adaptive time constants $\tau_d$ and $\tau_c$, where $\epsilon = \sigma_m - \theta$, said system deriving a value of LOS angle $\sigma_m$, an estimate of LOS angle $\hat{\sigma}$ and a residual LOS angle $\sigma_m - \hat{\sigma}$, the output of said filtering system being a smoothed line of sight rate $\hat{\sigma}$, actual missile lateral acceleration being detected by said IRU, the output of said IRU being a measure of actual lateral acceleration $\ddot{Y}_M$, said method comprising the steps of:

applying the boresight error angle $\epsilon$ to a first combining point;
multiplying the residual LOS angle output from said first combining point by a gain A to provide the value $A(\sigma_m - \hat{\sigma})$;
combining the value $A(\sigma_m - \hat{\sigma})$ with the LOS rate $\hat{\sigma}$ at a second combining point to provide an estimated LOS rate $\dot{\hat{\sigma}}$;
combining said estimated LOS rate $\dot{\hat{\sigma}}$ with said rate $\dot{\theta}$ to provide the value $\dot{\hat{\sigma}} - \dot{\theta}$;
integrating the value $\dot{\hat{\sigma}} - \dot{\theta}$ to provide $\hat{\sigma} - \theta$;
feeding back the value $\hat{\sigma} - \theta$ to said first combining point;
combining said value $\hat{\sigma} - \theta$ with the angle $\epsilon$ to provide the value $\sigma_m - \hat{\sigma}$ at the input to said filtering system;
multiplying the residual LOS angle by a gain B to provide the value $B(\sigma_m - \hat{\sigma})$;
multiplying the LOS rate $\hat{\sigma}$ by $2V_c$;
combining said multiplied LOS rate with acceleration term $\ddot{Y}_M$ at a third combining point to provide the term $2V_c \hat{\sigma} - \ddot{Y}_M$;
feeding back said term $2V_c \hat{\sigma} - \ddot{Y}_M$ to a fourth combining point;
multiplying the residual LOS angle by $AV_c$ to provide the value $AV_c(\sigma_m - \hat{\sigma})$;
feeding forward said value $AV_c(\sigma_m - \hat{\sigma})$ to a fifth combining point;
multiplying the residual LOS angle by a gain $C_1$ to provide the term $C_1(\sigma_m - \hat{\sigma})$;
combining the term $C_1(\sigma_m - \hat{\sigma})$ with a value $$\eta\left(\frac{V_c}{R} - 2\lambda\right)$$

at a twelfth combining point to provide a value $\dot{\eta}$;

integrating the value $\dot{\eta}$ to provide the value $\eta$, the LOS rate due to target acceleration;

multiplying $\eta$ by $(V_c/R) - 2\lambda$ in a feedback loop and applying $$\eta\left(\frac{V_c}{R} - 2\lambda\right)$$

to said twelfth combining point;

multiplying $\eta$ by R to provide an estimated target lateral acceleration value $\hat{Y}_T$;

combining $\hat{Y}_T$ with the value $2V_c\hat{\sigma} - \ddot{Y}_M$ at said fourth combining point to provide an estimated LOS acceleration term $\hat{\sigma}R$;

combining the values $AV_c(\sigma_m - \hat{\sigma})$ and $\hat{\sigma}R$ at said fifth combining point to provide the value $$2V_c\hat{\sigma} - \ddot{Y}_M + \hat{Y}_T + AV_c(\sigma_m - \hat{\sigma});$$

dividing the immediately preceding value by the range R to provide the value $$\eta + \frac{2\hat{\sigma}}{T_{go}} - \frac{\ddot{y}_M}{V_cT_{go}} + \frac{A}{T_{go}}(\sigma_m - \hat{\sigma});$$

combining the immediately preceding value with the value $B(\sigma_m - \hat{\sigma})$ at a sixth combining point to provide the corrective and predictive term $$\dot{\hat{\sigma}} = \eta + \frac{2\hat{\sigma}}{T_{go}} - \frac{\ddot{y}_M}{V_cT_{go}} + \left(B + \frac{A}{T_{go}}\right)(\sigma_m - \hat{\sigma}); \text{ then}$$

integrating the term $\dot{\hat{\sigma}}$ to provide the smoothed LOS rate $\hat{\sigma}$;

multiplying the residual LOS angle by gain B' to provide the term $B'(\sigma_m - \hat{\sigma})$;

combining $B'(\sigma_m - \hat{\sigma})$ with missile lateral acceleration value $\ddot{Y}_M$ and missile velocity estimate $\hat{\sigma}_M V_c/R$ at an eighth combining point to provide the output term $$\frac{\hat{\sigma}_M V_c}{R} - \ddot{y}_M + B'(\sigma_m - \hat{\sigma});$$

integrating the immediately preceding value to provide the estimated missile LOS rate component $\hat{\sigma}_M$;

applying said LOS rate estimate $\hat{\sigma}_M$ to said autopilot to provide body angle information;

combining said LOS estimated rate $\hat{\sigma}$ in a ninth combining point with missile LOS rate $\hat{\sigma}_M$ and a function of estimated LOS $-\hat{\sigma}V_c/R$ to provide the output $\hat{\sigma}_T$, the target estimated LOS rate component;

combining said target LOS rate component in a tenth combining point with a function of change in LOS rate due to target acceleration $\eta R/2V_c$;

multiplying the output of said tenth combining point by $R^2/V_c$ to provide the estimated target lateral displacement $\hat{Y}_T$;

twice integrating said missile lateral acceleration term $\ddot{Y}_M$ to provide missile lateral displacement $Y_M$;

combining said target and missile lateral displacements in an eleventh combining point to provide the miss distance Y evaluated at intercept, $Y = \hat{Y}_T - Y_M$;

dividing said miss distance Y by range R to provide system input, LOS angle $\sigma$;

gains A, B, B' and $C_1$ are noise-adaptive and dependent upon time-to-go, while the guidance filter output $\hat{\sigma}$ is also range dependent and includes both corrective and predictive terms; where $$A = (1/\tau_d) + (1/\tau_c),$$

$$B = 1/\tau_d\tau_c,$$

and $$B' = KB,$$

and $C_1$ noise adaptively varies inversely proportional to $\tau_d$;

multiplying a function of said guidance filter output $\hat{\sigma}$ by a gain $C_2$ and applying that product to a seventh combining point;

multiplying the estimated target lateral acceleration term $\hat{Y}_T$ by a gain $C_3$ which is a function of target bandwidth $Y_T$ and $T_{go}$, the value $C_3\hat{Y}_T$ being fed forward to said seventh combining point;

multiplying the missile lateral acceleration term $\ddot{Y}_M$ by a gain $C_4$ which is a function of autopilot dynamics $\lambda_M$ and $T_{go}$, the value $C_4\ddot{Y}_M$ being fed back to said seventh combining point;

multiplying said seventh combining point output $C_4\ddot{Y}_M + C_2\hat{\sigma} + C_3\hat{Y}_T$ by the navigation ratio n' which is also a function of autopilot dynamics and $T_{go}$; and applying the immediately preceding term to said autopilot as command acceleration to modify the position of the missile control surfaces and to account for target lateral acceleration and first order autopilot time lag, employing optimal guidance Law D to define gains $C_2$, $C_3$ and $C_4$ and navigation ratio n', thereby providing nearly optimal miss distance and low sensitivity to radome error.

5. The method recited in claim 1 or 2 wherein the gain $C_2 = V_c$.

6. The method recited in claim 3 or 4 wherein the gain $C_2 = V_c$.

7. The method recited in claim 3 or 4 wherein the gain $$C_4 = -\frac{e^{-\lambda_M T} + \lambda_M T - 1}{(\lambda_M T)^2}$$

where $\lambda_M$ is the bandwidth for the effective time lag in missile acceleration caused by the dynamics of the missile/autopilot combination; and T is $T_{go}$ (estimated time-to-go).

8. The method recited in claim 3 or 4 wherein the navigation ratio $$n' = \frac{3T^2[T - (1 - e^{-\lambda_M T})/\lambda_M]}{3\gamma + \frac{3}{2\lambda_M^3}(1 - e^{-2\lambda_M T}) + \frac{3T}{\lambda_M^2}(1 - 2e^{-\lambda_M T}) + T^2\left(T - \frac{3}{\lambda_M}\right)}$$

where
- $\lambda_M$ is the bandwidth for the effective time lag in missile acceleration caused by the dynamics of the missile/autopilot combination,
- T is $T_{go}$ (estimated time-to-go), and
- $\gamma$ is the control effort weighting factor.

9. The method recited in claim 7 wherein the navigation ratio $$n' = \frac{3T^2[T - (1 - e^{-\lambda_M T})/\lambda_M]}{3\gamma + \frac{3}{2\lambda_M^3}(1 - e^{-2\lambda_M T}) + \frac{3T}{\lambda_M^2}(1 - 2e^{-\lambda_M T}) + T^2\left(T - \frac{3}{\lambda_M}\right)}$$

where
- $\lambda_M$ is the bandwidth for the effective time lag in missile acceleration caused by the dynamics of the missile/autopilot combination,
- T is $\hat{T}_{go}$ (estimated time-to-go), and
- $\gamma$ is the control effort weighting factor.

10. The method recited in claim 1 or 2 wherein the gain $$C = \frac{e^{-2\lambda_T T} + 2\lambda_T T - 1}{(2\lambda_T T)^2}$$

11. The method recited in claim 5 wherein the gain $$C_3 = \frac{e^{-2\lambda_T T} + 2\lambda_T T - 1}{(2\lambda_T T)^2}$$

12. The method recited in claim 1 or 2 wherein the navigation ratio $$n' = \frac{3T^3}{3\gamma + T^3}$$

where
- $\gamma$ is the control effort weighting factor; and
- T = $\hat{T}_{go}$ (estimated time-to-go).

13. The method recited in claim 5 wherein the navigation ratio $$n' = \frac{3T^3}{3\gamma + T^3}$$

where
- $\gamma$ is the control effort weighting factor; and
- T = $\hat{T}_{go}$ (estimated time-to-go).

14. The method recited in claim 10 wherein the navigation ratio $$n' = \frac{3T^3}{3\gamma + T^3}$$

where
- $\gamma$ is the control effort weighting factor; and
- T = $\hat{T}_{go}$ (estimated time-to-go).

15. The method recited in claim 11 wherein the navigation ratio $$n' = \frac{3T^3}{3\gamma + T^3}$$

where
- $\gamma$ is the control effort weighting factor, and
- T = $\hat{T}_{go}$ (estimated time-to-go).

* * * * *